US012584037B2

(12) United States Patent
Lamers et al.

(10) Patent No.: US 12,584,037 B2
(45) **Date of Patent: *Mar. 24, 2026**

(54) HIGH ACID VALUE POLYESTER

(71) Applicant: PPG Industries Ohio, Inc., Cleveland, OH (US)

(72) Inventors: Paul Hubert Lamers, Allison Park, PA (US); Christopher A. Verardi, Pittsburgh, PA (US); Wei Wang, Allison Park, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 302 days.

This patent is subject to a terminal disclaimer.

(21) Appl. No.: 18/256,728

(22) PCT Filed: Dec. 10, 2021

(86) PCT No.: PCT/US2021/062752

§ 371 (c)(1),
(2) Date: Jun. 9, 2023

(87) PCT Pub. No.: WO2022/125860

PCT Pub. Date: Jun. 16, 2022

(65) Prior Publication Data

US 2024/0018384 A1 Jan. 18, 2024

Related U.S. Application Data

(60) Provisional application No. 63/123,527, filed on Dec. 10, 2020.

(51) Int. Cl.
*C09D 167/00* (2006.01)
*C08J 7/04* (2020.01)
(Continued)

(52) U.S. Cl.
CPC .............. *C09D 167/00* (2013.01); *C08J 7/04* (2013.01); *C08L 67/00* (2013.01); *C08L 67/08* (2013.01)

(58) Field of Classification Search
CPC ........ C09D 167/00; C09D 171/08; C08J 7/04; C08J 2371/08; C08G 63/668; C08L 61/28; C08L 67/00; C08K 5/34922
See application file for complete search history.

(56) References Cited

U.S. PATENT DOCUMENTS

| | | |
|---|---|---|
| 4,650,718 A | 3/1987 | Simpson |
| 5,370,910 A | 12/1994 | Hille et al. |

(Continued)

FOREIGN PATENT DOCUMENTS

| | | |
|---|---|---|
| CA | 3140367 A1 | 11/2020 |
| CN | 103328212 A | 9/2013 |

(Continued)

OTHER PUBLICATIONS

CYMEL—Amino Resin Crosslinkers for the Coating Industry Product and Application Guide, Cytec, 2008, Pub. No. 250185E, Version A, www.cytec.com (Year: 2008).*

(Continued)

*Primary Examiner* — Michael C. Romanowski

(57) ABSTRACT

A coating composition includes (a) a melamine resin having imino and methylol functional groups that together include 30 mole % or greater of the total functionality of the melamine resin; and (b) at least one polymer reactive with (a) that is obtained from components including polytetrahydrofuran and a carboxylic acid or anhydride thereof. The polytetrahydrofuran includes greater than 20 weight % of the components that form the polymer (b) and the carboxylic acid or anhydride thereof includes greater than 13 weight % of the components that form the polymer (b). The polymer
(Continued)

(b) has an acid value ranging from 40 to 60 based on the total resin solids of the polymer (b).

25 Claims, 1 Drawing Sheet

(51) Int. Cl.
*C08L 67/00* (2006.01)
*C08L 67/08* (2006.01)

(56) References Cited

U.S. PATENT DOCUMENTS

| | | | |
|---|---|---|---|
| 5,814,410 | A | 9/1998 | Singer |
| 5,891,981 | A | 4/1999 | Mauer, III |
| 8,846,156 | B2 | 9/2014 | Swarup |
| 2003/0149227 | A1 | 8/2003 | Okazaki |
| 2012/0045585 | A1* | 2/2012 | Tsukamoto ............ B05D 7/572 427/379 |
| 2013/0302582 | A1 | 11/2013 | Matsunaga et al. |
| 2014/0316042 | A1* | 10/2014 | Kamikuri ............. C09D 167/02 524/377 |
| 2016/0017176 | A1* | 1/2016 | Wonnemann .......... B05D 7/576 428/458 |
| 2016/0347957 | A1 | 12/2016 | Steinmetz et al. |
| 2017/0137666 | A1 | 5/2017 | Steinmetz et al. |
| 2017/0158906 | A1 | 6/2017 | Steinmetz et al. |
| 2017/0204289 | A1 | 7/2017 | Kurtz |
| 2018/0362799 | A1* | 12/2018 | Steinmetz ............ C09D 151/08 |

FOREIGN PATENT DOCUMENTS

| | | | | |
|---|---|---|---|---|
| EP | 1454971 | A1 | 2/2006 | |
| EP | 3178864 | A1 | 6/2017 | |
| EP | 3480261 | A1 * | 5/2019 | ......... C09D 167/025 |
| WO | 2017/180220 | A1 | 10/2017 | |
| WO | WO-2019241234 | A1 * | 12/2019 | ........... C09D 161/28 |

OTHER PUBLICATIONS

International Search Report and Written Opinion received for PCT Application Serial No. PCT/US2021/062752 dated Apr. 12, 2022, 7 pages.

* cited by examiner

HIGH ACID VALUE POLYESTER

CROSS-REFERENCE TO RELATED APPLICATIONS

This present application is a U.S. national stage filing under 35 U.S.C. § 371 of International Application No. PCT/US2021/062752, filed on Dec. 10, 2021, which claims the benefit under 35 U.S.C. § 119(e) of prior U.S. Provisional Application Ser. No. 63/123,527, filed Dec. 10, 2020, under 35 U.S.C. 119, titled "HIGH ACID VALUE POLYESTER" which is incorporated herein by reference.

FIELD OF THE INVENTION

The present invention relates to coating compositions, coatings prepared with the coating compositions, and methods of preparing coatings.

BACKGROUND OF THE INVENTION

Coatings are applied to a wide variety of substrates to provide color and other visual effects, corrosion resistance, abrasion resistance, chemical resistance, and the like. In addition, various types of coatings, such as coatings applied to packaging and automotive substrates, can be formed from compositions that can be baked and formed at low cure temperatures. Because these compositions can be baked at low cure temperatures, they have been found useful in forming coatings at faster application times and with reduced costs. It is accordingly an objective of the present invention to provide coating compositions that can be dehydrated and cured at comparatively low temperatures to form coatings having various properties, thereby reducing costs and increasing efficiency of coating processes.

SUMMARY OF THE INVENTION

The present invention relates to a coating composition that includes: (a) a melamine resin including imino and methylol functional groups that together comprise 30 mole % or greater of the total functionality of the melamine resin; and (b) at least one polymer reactive with (a) that is obtained from components including polytetrahydrofuran and a carboxylic acid or anhydride thereof, where the polytetrahydrofuran includes greater than 20 weight % of the components that form the polymer (b) and the carboxylic acid or anhydride thereof includes greater than 13 weight % of the components that form the polymer (b), and where the polymer (b) has an acid value ranging from 40 to 60 based on the total resin solids of the polymer (b) if it does not comprise core-shell particles; or where the polymer (b) reactive with the melamine resin (a) includes polymeric core-shell particles, where at least a portion of a polymeric shell of the core-shell particles is covalently bonded to at least a portion of a polymeric core of the core-shell particles, and where the polymeric shell of the core-shell particles is obtained from components including greater than 20 weight % of the components that form the polymeric shell of polytetrahydrofuran and greater than 13 weight % of the components that form the polymeric shell of carboxylic acid or anhydride thereof and in which the polymeric shell has an acid value ranging 40 to 60 based on the total resin solids of the polymer that forms the polymeric shell.

DESCRIPTION OF THE INVENTION

Figure 1A:
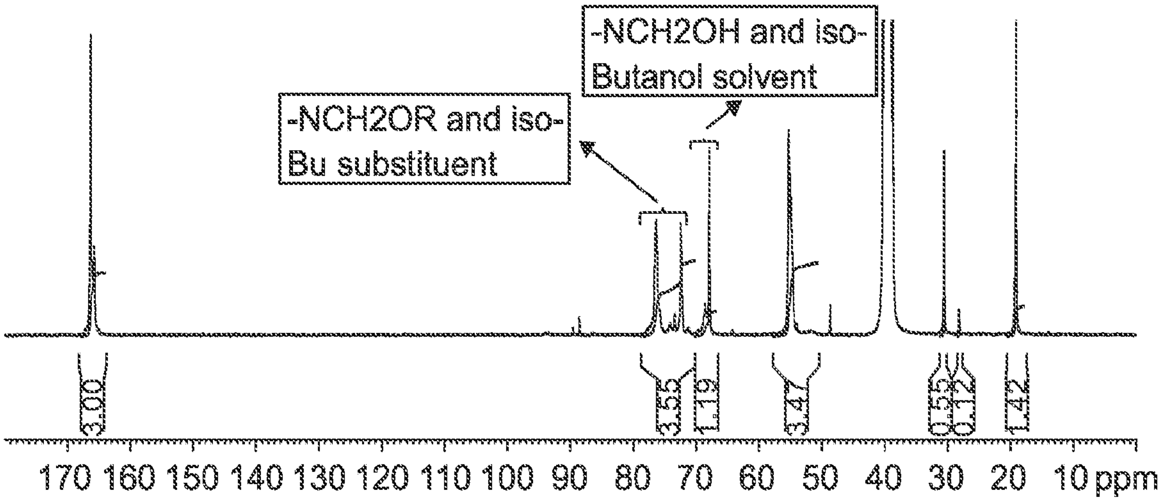
FIG. 1*a* is a $^{13}$C-NMR spectra obtained for the melamine of RESIMENE HM 2608.

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" melamine resin, "a" polymer, "a" coating composition, and the like refer to one or more of any of these items.

The present invention is directed to a coating composition comprising a melamine resin and at least one polymer reactive with the melamine resin. As used herein, a "melamine resin" refers to a resin with melamine rings terminated with multiple hydroxyl groups derived from formaldehyde. Further, the term "resin" is used interchangeably with "polymer." As used herein, the term "polymer" refers to oligomers and homopolymers (e.g., prepared from a single monomer species), copolymers (e.g., prepared from at least two monomer species), terpolymers (e.g., prepared from at least three monomer species) and graft polymers.

The melamine resin used for the present invention may be the resin obtained by addition-condensation of melamine with formaldehyde by methods known to the art, or the resin obtained by further addition-condensation of such resins with various alcohols such as methanol, butanol, and/or isobutanol. Further, the melamine resin used with the present invention comprises imino and methylol functional groups. The imino and methylol functional groups together comprise 30 mole % or greater of the total functionality of the melamine resin, or 35 mole % or greater of the total functionality of the melamine resin, or 40 mole % or greater of the total functionality of the melamine resin, or 50 mole % or greater of the total functionality of the melamine resin, or 55 mole % or greater of the total functionality of the melamine resin, or 60 mole % or greater of the total functionality of the melamine resin, or 70 mole % or greater of the total functionality of the melamine resin, or 80 mole % or greater of the total functionality of the melamine resin, or 90 mole % or greater of the total functionality of the melamine resin, or up to 100 mole % of the total functionality of the melamine resin. The imino and methylol functional groups together can comprise an amount ranging from, for example, from 30 mole % to 80 mole %, or from 40 mole % to 80 mole %, or from 50 mole % to 70 mole %, of the total functionality of the melamine resin.

It is appreciated that the amount of the imino functional groups on the melamine resin can be greater than the amount of the methylol functional groups on the melamine resin. Alternatively, the amount of the methylol functional groups on the melamine resin can be greater than the amount of the imino functional groups on the melamine resin.

The mole % of the functional groups on the melamine resin is determined by quantitative $^{13}$C-NMR. Quantitative $^{13}$C-NMR data was acquired in a BRUKER AVANCE II spectrometer (manufactured by the Bruker Corporation (Billerica, MA)) operating at a carbon frequency of 75.48 MHz NMR. Dimethyl sulfoxide-$d_6$ (DMSO-$d_6$) was used as the NMR solvent. $Cr(acac)_3$ was used as a relaxation agent for quantitative $^{13}$C NMR, which was recorded with relaxation times of 3 s, a pulse angle of 90 degree, and an acquisition time of 0.66 s. One possible structure of a melamine resin is shown below. Each triazine ring is substituted by six functional groups. In the structure shown below, the triazine is substituted with one imino group (—NH), one methylol group (—$CH_2OH$), two methoxy groups (—$CH_2OMe$), one n-butoxy group (—$CH_2OBu$), and one isobutoxy group (—$CH_2$OisoBu). A fraction of the six functional groups on each triazine ring may be bridges to other triazine rings (often referred to as crosslinks). These bridges should still be considered as functional groups for the sake of calculating the percentage functional groups on the melamine that are imino or methylol. Specifically, as will be seen below, since the level of imino groups cannot be determined directly by $^{13}$C-NMR, it has to be determined by difference between the theoretical six functional groups per triazine ring and the level other functional groups (which can be determined directly). The bridge groups, the level of which can be determined by $^{13}$C-NMR, should be included when performing this calculation.

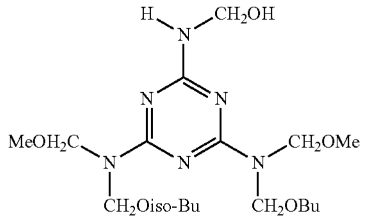

Figure 1B:
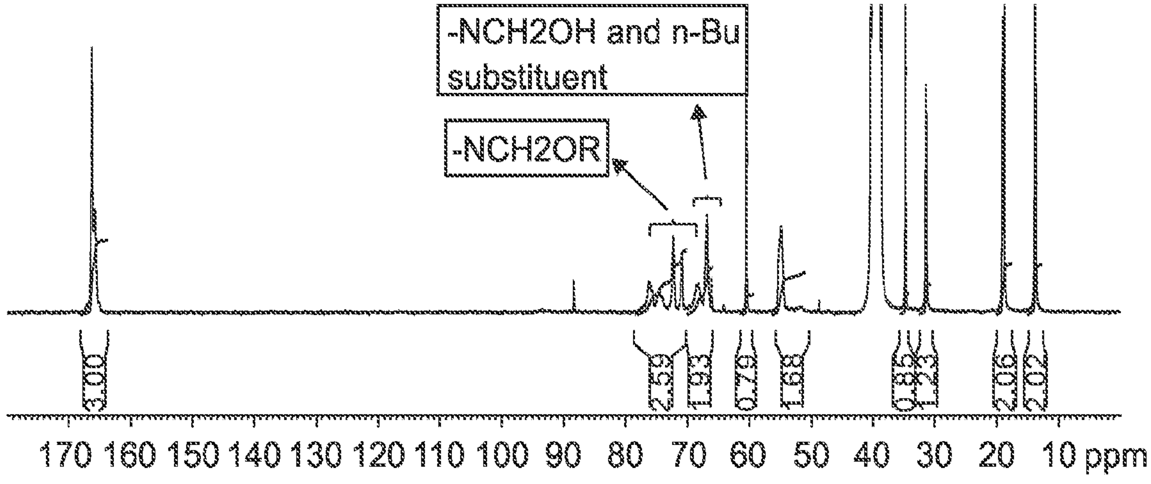
FIG. 1*b* is a $^{13}$C-NMR spectra obtained for the melamine of CYMEL 202.

Examples of characteristic $^{13}$C-NMR peaks for typical substituents are 55 ppm (—OMe), 28 ppm (iso-Bu), 90 ppm (bridge or crosslink), 13/31.5/64 ppm (-nBu). The carbon peak for —$NCH_2OH$ shows up in the range of 66 to 70 ppm, and carbon peaks for —$NCH_2OR$ shows up in the range of 70-79 ppm (where R includes an alkoxy group or a bridge group to another triazine ring). Further, —$NCH_2OH$/—$NCH_2OR$ carbon peaks could be overlapping with substituent or solvent peaks. In FIGS. 1*a* and 1*b*, for example, iso-butanol solvent is overlapping with —$NCH_2OH$ carbon in $^{13}$C NMR spectrum of RESIMENE HM 2608 (melamine formaldehyde resin, commercially available from INEOS (London, United Kingdom)). Therefore, these peaks from substituents or solvents need to be considered to calculate the mole % of imino group or methylol group.

When using the $^{13}$C-NMR data to calculate the percentage of melamine functional groups that are imino and/or methylol, the triazine ring carbons (166 ppm) are normalized to be 3. For each triazine ring, there are theoretically 6 substituents. Mole % of NH and methylol are calculated from the peak intensities after normalizing the triazine ring carbons to 3.

The previously described procedure is illustrated for two melamines, RESIMENE HM 2608 and CYMEL 202 (melamine formaldehyde resin, commercially available from Allnex (Frankfurt, Germany)), using the $^{13}$C-NMR obtained for these melamines and which is shown in FIG. 1*a* (RESIMENE HM 2608) and FIG. 1*b* (CYMEL 202).

The mole % of imino groups is calculated using the following equation 1: Mole % imino$=100\times(6-I_{—NCH2OR}-I_{—NCH2OH})/6$. Further, the mole % of methylol groups is calculated by equation 2: Mole % methylol$=100\times(I_{—NCH2OH})/6$.

With respect to equations 1 and 2, R is the alkyl group and $I_{—NCH2OR}$ is the peak intensity of —N$\underline{C}H_2$OR carbons, which can be obtained by $I_{—NCH2OR}=I_{(70\text{-}79\ ppm)}-I_{\text{-}isoBu\ substituent\ (28\ ppm)}$. Further, $I_{—NCH2OH}$ is the peak intensity of —N$\underline{C}H_2$OH carbons, which can be obtained by $I_{—NCH2OH}=I_{(66\text{-}70\ ppm)}-I_{\text{-}nBu\ substituent\ (31.5\ ppm)}-I_{\text{-}isoButanol\ (30.5\ ppm)}$.

For RESIMENE HM 2608, the mole % calculation for imino using equation 1 is illustrated as follows: Mole % imino$=100\times(6-I_{—NCH2OR}-I_{—NCH2OH})/6=100\times[6-(3.55-0.12)-(1.19-0.55)]/6=32.2\%$. For RESIMENE HM 2608, the mole % calculation for methylol using equation 2 is illustrated as follows: Mole % methylol$=100\times(I_{—NCH2OH})/6=100\times(0.64)/6=10.7\%$.

For CYMEL 202, the mole % calculation for imino using equation 1 is illustrated as follows: Mole % imino$=100\times(6-I_{—NCH2OR}-I_{—NCH2OH})/6=100\times[6-2.59-(1.93-1.23)]/6=45.2\%$. For CYMEL 202, the mole % calculation for methylol using equation 2 is illustrated as follows: Mole % methylol$=100\times(I_{—NCH2OH})/6=100\times(0.7)/6=11.7\%$.

The previously described method of determining the mole % of the functional groups on the melamine resin is referred to herein as the "melamine functional group mole % method". It will be appreciated that the presence of other components or other types of substituents or solvents could generate additional peaks not described above or interfere with peak integrals, for example, N$\underline{C}H_2$OR carbons (70-79 ppm) in $^{13}$C-NMR, and their contribution would be considered for calculation of imino and methylol functionalities.

It is appreciated that when the imino and methylol functional groups together comprise less than 100 mole % of the total functionality of the melamine resin, one or more other functional groups make up the remaining mole % of the total functionality of the melamine resin. Non-limiting examples of additional functional groups include methoxy groups (—$CH_2OMe$), n-butoxy groups (—$CH_2OBu$), isobutoxy groups, and combinations thereof. Alternatively, the melamine resin can be free of all other functional groups except for the imino and methylol functional groups. In such examples, the imino and methylol functional groups together comprise 100 mole % of the total functionality of the melamine resin.

The mole % of functional groups on the melamine that are bridges to other triazine rings (or crosslinks) can also be determined by $^{13}C$-NMR characterization. The mole % of functional groups on the melamine that are bridges to other triazine rings (or crosslinks) can be less than 10 mole % of the total functionality of the melamine resin, or less than 5 mole % of the total functionality of the melamine resin, or less than 3 mole % of the total functionality of the melamine resin, or less than 2 mole % of the total functionality of the melamine resin.

The melamine resin of the present invention can comprise at least 5 weight %, at 10 weight %, or at least 15 weight %, based on the total resin solids of the coating composition. The melamine resin of the present invention can also comprise up to 40 weight %, up to 35 weight %, or up to 30 weight %, based on the total resin solids of the coating composition. The melamine resin of the present invention can further comprise an amount ranging from 5 weight % to 40 weight %, or from 15 weight % to 30 weight %, or from 5 weight % to 35 weight %, or from 10 weight % to 35 weight %, based on the total resin solids of the coating composition.

As indicated, the coating composition also comprises at least one polymer reactive with the melamine resin. The polymer reactive with the melamine resin is obtained from components comprising polytetrahydrofuran and a carboxylic acid or an anhydride thereof. The carboxylic acid or anhydride can be selected from various types of polycarboxylic acids or the anhydrides thereof, such as from a dicarboxylic acid or anhydride thereof, or from a polycarboxylic acid having three or more carboxylic acid groups or the anhydrides thereof. The carboxylic acid or anhydride thereof can also be selected from compounds having aromatic rings or aliphatic structures. As used herein, an "aromatic group" refers to a cyclically conjugated hydrocarbon with a stability (due to delocalization) that is significantly greater than that of a hypothetical localized structure. Further, the term "aliphatic" refers to non-aromatic straight, branched, or cyclic hydrocarbon structures that contain saturated carbon bonds.

Non-limiting examples of carboxylic acids include glutaric acid, succinic acid, malonic acid, oxalic acid, trimellitic acid, phthalic acid, isophthalic acid, hexahydrophthalic acid, adipic acid, maleic acid, and combinations thereof. As indicated, an anhydride can be used, such as an anhydride of any of the previously described carboxylic acids. Non-limiting examples of such anhydrides include trimellitic anhydride, phthalic anhydride, maleic anhydride, succinic anhydride, malonic anhydride, oxalic anhydride, hexahydrophthalic anhydride, adipic anhydride, and combinations thereof.

As indicated, the carboxylic acid or anhydride thereof can be selected from compounds having aromatic rings or aliphatic structures. For instance, the carboxylic acid or anhydride thereof can be selected from an aromatic compound in which the carboxylic acid or anhydride functional groups are bonded directly to the aromatic ring(s) such that there is no interrupting atoms between the aromatic ring(s) and the attached carboxylic acid or anhydride functional groups (a non-limiting example being trimellitic anhydride).

The polymer reactive with the melamine resin can also be prepared with other components in addition to the previously described polytetrahydrofuran and carboxylic acid or anhydride thereof. Non-limiting examples of additional components that can be used to form the polymer include polyols in addition to the polytetrahydrofuran, additional compounds containing one or more carboxylic acid groups or anhydrides thereof, ethylenically unsaturated compounds, polyisocyanates, and combinations thereof.

As used herein, "ethylenically unsaturated" refers to a group having at least one carbon-carbon double bond. Non-limiting examples of ethylenically unsaturated groups include, but are not limited to, (meth)acrylate groups, vinyl groups, and combinations thereof. As used herein, the term "(meth)acrylate" refers to both the methacrylate and the acrylate.

Examples of polyols include glycols, polyether polyols, polyester polyols, copolymers thereof, and combinations thereof. Non-limiting examples of glycols include ethylene glycol, diethylene glycol, triethylene glycol, 1,2-propylene glycol, 1,3-butylene glycol, tetramethylene glycol, hexamethylene glycol, and combinations thereof, as well as other compounds that comprise two or more hydroxyl groups and combinations of any of the foregoing. Non-limiting examples of suitable polyether polyols in addition to the polytetrahydrofuran include polyethylene glycol, polypropylene glycol, polybutylene glycol, and combinations thereof.

Other suitable polyols include, but are not limited to, cyclohexanedimethanol, 2-ethyl-1,6-hexanediol, 1,3-propanediol, 1,4-butanediol, neopentyl glycol, trimethylol propane, 1,2,6-hexanetriol, glycerol, and combinations thereof. It is appreciated that the polyol can be selected from diols and/or from compounds having 3 or more hydroxyl groups.

The additional compounds containing one or more carboxylic acid groups or anhydrides can include any of the previously described carboxylic acids and anhydrides provided that the additional compound is different from the first carboxylic acid or anhydride. For instance, the components that form the polymer reactive with the melamine resin can include both trimellitic anhydride and maleic anhydride.

Non-limiting examples of ethylenically unsaturated monomers include, but are not limited to, alkyl esters of (meth)acrylic acid, hydroxyalkyl esters of (meth)acrylic acid, acid group containing ethylenically unsaturated monomers, vinyl aromatic monomers, and combinations thereof.

Non-limiting examples of alkyl esters of (meth)acrylic acid include methyl (meth)acrylate, ethyl (meth)acrylate, butyl (meth)acrylate, isobutyl (meth)acrylate, ethylhexyl (meth)acrylate, lauryl (meth)acrylate, octyl (meth)acrylate, glycidyl (meth)acrylate, isononyl (meth)acrylate, isodecyl (meth)acrylate, vinyl (meth)acrylate, acetoacetoxyethyl (meth)acrylate, acetoacetoxypropyl (meth)acrylate, and combinations thereof. Other non-limiting examples include di(meth)acrylate alkyl diesters formed from the condensation of two equivalents of (meth)acrylic acid such as, for example, ethylene glycol di(meth)acrylate. Di(meth)acrylate alkyl diesters formed from $C_{2-24}$ diols such as butane diol and hexane diol can also be used.

Non-limiting examples of hydroxyalkyl esters of (meth) acrylic acid include hydroxymethyl (meth)acrylate, hydroxyethyl (meth)acrylate, hydroxypropyl (meth)acrylate, hydroxybutyl (meth)acrylate, and combinations thereof.

Non-limiting examples of acid group containing ethylenically unsaturated monomers include (meth)acrylic acid, itaconic acid, maleic acid, fumaric acid, crotonic acid, aspartic acid, malic acid, mercaptosuccinic acid, and combinations thereof.

Non-limiting examples of vinyl aromatic monomers include styrene, 2,4-dimethylstyrene, ethylstyrene, isopropylstyrene, butylstyrene, vinyl naphthalene, vinyl toluene, divinyl aromatic monomers, such as divinyl benzene, and combinations thereof.

Non-limiting examples of suitable polyisocyanates include isophorone diisocyanate (IPDI), dicyclohexylmethane 4,4'-diisocyanate (H12MDI), cyclohexyl diisocyanate (CHDI), m-tetramethylxylylene diisocyanate (m-TMXDI), p-tetramethylxylylene diisocyanate (p-TMXDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, 1,4-methylene bis-(cyclohexyl isocyanate), toluene diisocyanate (TDI), m-xylylenediisocyanate (MXDI) and p-xylylenediisocyanate, 4-chloro-1,3-phenylene diisocyanate, 1,5-tetrahydro-naphthalene diisocyanate, 4,4'-dibenzyl diisocyanate, and 1,2,4-benzene triisocyanate, xylylene diisocyanate (XDI), and mixtures or combinations thereof.

It is appreciated that the previously described optional additional components can be used to modify or adjust the properties of the polymer and the final coating formed therewith. For instance, the polymer can be formed with additional components, such as an additional polyol, that can provide a faster cure at lower bake temperatures such as temperatures of 80° C. or lower.

The polytetrahydrofuran used to form the polymer can comprise greater than 20 weight % of the components that form the polymer, or greater than 30 weight % of the components that form the polymer, or greater than 40 weight % of the components that form the polymer. The polytetrahydrofuran can also comprise up to 50 weight % of the components that form the polymer, or up to 60 weight % of the components that form the polymer, or up to 70 weight % of the components that form the polymer, or up to 80 weight % of the components that form the polymer, or up to 90 weight % of the components that form the polymer. The polytetrahydrofuran can further comprise an amount ranging from 20 weight % to 90 weight % of the components that form the polymer, or from 40 weight % to 80 weight % of the components that form the polymer, or from 50 weight % to 70 weight % of the components that form the polymer, or from 30 weight % to 40 weight % of the components that form the polymer.

The carboxylic acid or anhydride used to form the polymer can comprise greater than 13 weight % of the components that form the polymer, or greater than 15 weight % of the components that form the polymer. The carboxylic acid or anhydride can also comprise up to 21 weight % of the components that form the polymer, or up to 18 weight % of the components that form the polymer. The carboxylic acid or anhydride used to form the polymer can comprise from 13 weight % to 21 weight % of the components that form the polymer.

It is appreciated that one or more of the previously described additional components can make up the remaining amount of components used to form the polymer reactive with the melamine resin. For example, the polymer can be prepared with polytetrahydrofuran, a carboxylic acid or anhydride, a polyol that is different from the polytetrahydrofuran, and another carboxylic acid or anhydride that is different from the first carboxylic acid or anhydride.

The resulting polymer prepared from the previously described components comprises at least ether linkages and carboxylic acid functional groups. The resulting polymer can also comprise ester linkages and/or urethane linkages as well as additional functional groups such as hydroxyl functional groups. For instance, the resulting polymer can comprise ether linkages, ester linkages, carboxylic acid functional groups, and hydroxyl functional groups. The resulting polymer can also comprise additional linkages and functional groups including, but not limited to, the previously described additional functional groups.

The polymer reactive with the melamine resin can comprise polymeric core-shell particles in which the polymeric core is at least partially encapsulated by the polymeric shell, a self-emulsifying dispersion polymer, or a combination thereof.

The polymer that is reactive with the melamine resin can have an acid value of at least 40, or at least 42, or at least 45, or at least 47, or at least 49, or at least 50 based on the total resin solids of the polymer if it does not comprise core-shell particles. The polymer that is reactive with the melamine resin can have an acid value of up to 60, or up to 57, or up to 55, or up to 53, or up to 51, or up to 50 based on the total resin solids of the polymer if it does not comprise core-shell particles. The polymer that is reactive with the melamine resin can have an acid value ranging from 40 to 60, or from 42 to 57, or from 45 to 55, or from 47 to 53, or from 49 to 51 based on the total resin solids of the polymer if it does not comprise core-shell particles. The acid value is determined as described in the examples.

The polymer that is reactive with the melamine resin may comprise polymeric core shell particles were at least a portion of a polymeric shell of the core-shell particles is covalently bonded to at least a portion of a polymeric core of the core-shell particles. The polymeric shell of the core-shell particles may be obtained from components comprising greater than 20 weight % of the components that form the polymeric shell of polytetrahydrofuran and greater than 13 weight % of the components that form the polymeric shell of carboxylic acid or anhydride thereof. The polymeric shell can have an acid value of at least 40, or at least 42, or at least 45, or at least 47, or at least 49, or at least 50 based on the total resin solids of the polymer. The polymeric shell can have an acid value of up to 60, or up to 57, or up to 55, or up to 53, or up to 51, or up to 50 based on the total resin solids of the polymer. The polymeric shell can have an acid value ranging from 40 to 60, or from 42 to 57, or from 45 to 55, or from 47 to 53, or from 49 to 51 based on the total resin solids of the polymer.

To determine the acid value of the polymeric shell, the polymeric shell may first be synthesized in a separate step from the polymeric core. The polymeric shell is synthesized as described herein for the polymer (b). After the synthesis of the polymeric shell, the acid value of the polymeric shell is determined before forming the polymeric core. The acid value of the polymeric shell is determined as described in the examples. Once the acid value of the polymeric shell is determined, the polymeric shell may then be dispersed in water and the monomers of the polymeric core added. An initiator may then be added to polymerize the monomers of the polymeric core. The polymeric shell may be covalently bonded to at least a portion of the polymeric core.

As indicated, the core-shell particles comprise a polymeric core as well as a polymeric shell. A "polymeric core" means that the core of the core-shell particle comprises one or more polymers and a "polymeric shell" means that the shell of the core-shell particle comprises one or more polymers.

As used herein, a core-shell particle in which the core is at least partially encapsulated by the shell refers to a particle comprising (i) at least a first material or materials that form the center of the particle (i.e., the core) and (ii) at least a second material or materials (i.e., the shell) that form a layer over at least a portion of the surface of the first material(s)

(i.e., the core). It is appreciated that the first material(s) that forms the core is different from the second material(s) that forms the shell. Further, the core-shell particles can have various shapes (or morphologies) and sizes. For example, the core-shell particles can have generally spherical, cubic, platy, polyhedral, or acicular (elongated or fibrous) morphologies. The core-shell particles can also have an average particle size of 30 to 300 nanometers, or from 40 to 200 nanometers, or from 50 to 150 nanometers. As used herein, "average particle size" refers to volume average particle size. The average particle size can for example be determined with a ZETASIZER 3000HS, manufactured by Malvern Instruments (Worcestershire, United Kingdom) following the instructions in the ZETASIZER 3000HS manual.

The polymeric shell of the core-shell particles may be obtained from the previously described components comprising the polytetrahydrofuran, a carboxylic acid or anhydride thereof, hydroxyl functional ethylenically unsaturated compound(s) and, optionally, other additional components (e.g., additional polyols, additional carboxylic acid and/or anhydrides, polyisocyanates, and/or combinations thereof). Further, the polymeric core typically comprises an addition polymer derived from ethylenically unsaturated monomers.

The polytetrahydrofuran can comprise an amount ranging from 20 weight % to 90 weight % of the components that form the polymeric shell, or from 40 weight % to 80 weight % of the components that form the polymeric shell, or from 50 weight % to 70 weight % of the components that form the polymeric shell, or from 55 to 65 weight % of the components that form the polymeric shell.

The carboxylic acid or anhydride can comprise an amount ranging from 13 weight % to 21 weight % of the components that form the polymeric shell, or from 15 weight % to 18 weight % of the components that form the polymeric shell, or from 17 weight % to 19 weight % of the components that form the polymeric shell.

The polymeric shell may also be covalently bonded to at least a portion of the polymeric core. For example, the polymeric shell can be covalently bonded to the polymeric core by reacting at least one functional group on the monomers and/or prepolymers that are used to form the polymeric shell with at least one functional group on the monomers and/or prepolymers that are used to form the polymeric core. The functional groups can include any of the functional groups previously described provided that at least one functional group on the monomers and/or prepolymers that are used to form the polymeric shell is reactive with at least one functional group on the monomers and/or prepolymers that are used to form the polymeric core. For instance, the monomers and/or prepolymers that are used to form the polymeric shell and polymeric core can both comprise at least one ethylenically unsaturated group that are reacted with each other to form a chemical bond. As used herein, a "prepolymer" refers to a polymer precursor capable of further reactions or polymerization by one or more reactive groups to form a higher molecular mass or cross-linked state.

When the polymeric shell is covalently bonded to the polymeric core, the acid value of the core-shell particles may be lower than that of the polymeric shell (considered by itself) due to the presence of the polymeric core. The acid value of the core-shell particles may be calculated by multiplying the acid value of the polymeric shell, determined as described in the examples, with the weight percentage of the polymeric shell present in the core-shell particles. For example, if the determined acid value of the polymeric shell was 50, and the core shell particles comprise 50 weight % of polymeric shell, the acid value of the core-shell particles would be 50*(0.5)=25, assuming the polymeric core has an acid value of 0.

A portion of the polymeric shells may not react with the polymeric core to form core-shell particles. As such, the coating composition may comprise both core-shell particles as described herein and polymeric shell polymers that are not bonded to polymeric cores.

The polymeric core and polymeric shell of the core-shell particles may be prepared to provide a hydrophilic polymeric shell with enhanced water-dispersibility/stability and a hydrophobic polymeric core. As used herein, the term "hydrophilic" refers to polymers, monomers, and other materials that have an affinity for water and which will disperse or dissolve in water or other aqueous based mediums. Hydrophilic materials, such as hydrophilic polymers, typically have water-dispersible groups. A "water-dispersible group" refers to a group having or formed from one or more hydrophilic functional groups that have an affinity for water and which help disperse a compound, such as a polymer, in water or other aqueous based mediums. Further, as used herein, the term "hydrophobic" refers to polymers, monomers, and other materials that lack an affinity for water or other aqueous based mediums and tend to repel, not dissolve or disperse in, and/or not be wetted by water or other aqueous based mediums. Hydrophobic materials, such as hydrophobic polymers, are often free of water-dispersible groups.

As indicated, the polymeric core and polymeric shell of the core-shell particles can be prepared to provide a hydrophilic polymeric shell with enhanced water-dispersibility/stability and a hydrophobic polymeric core. Thus, the polymeric shell can comprise hydrophilic water-dispersible groups while the polymeric core can be free of hydrophilic water-dispersible groups. The hydrophilic water-dispersible groups can increase the water-dispersibility/stability of the polymeric shell in an aqueous medium so that the polymeric shell at least partially encapsulates the hydrophobic core.

As previously described, the water-dispersible groups comprise one or more hydrophilic functional groups. For example, the polymer(s) that form the hydrophilic polymeric shell can comprise ionic or ionizable groups such as the carboxylic acid functional groups or salts thereof. The carboxylic acid functional groups can be at least partially neutralized (i.e., at least 30% of the total neutralization equivalent) by a base, such as a volatile amine, to form a salt group. A volatile amine refers as an amine compound having an initial boiling point of less than or equal to 250° C. as measured at a standard atmospheric pressure of 101.3 kPa. Examples of suitable volatile amines are ammonia, dimethylamine, trimethylamine, monoethanolamine, and dimethylethanolamine. It is appreciated that the amines may evaporate during the formation of the coating to expose the carboxylic acid functional groups and allow the carboxylic acid functional groups to undergo further reactions. Other non-limiting examples of water-dispersible groups include polyoxyalkylene groups such as by using polyethylene/propylene glycol ether materials for example.

As indicated, the polymer reactive with the melamine resin can comprise a self-emulsifying dispersion polymer. As used herein, a "self-emulsifying dispersion polymer" refers to a polymer that contains hydrophilic functionality and is not synthesized initially as an aqueous dispersion, and is then mixed with water to form an aqueous dispersion.

The self-emulsifying dispersion polymer of the present invention may be obtained from the previously described components comprising the polytetrahydrofuran, the carboxylic acid or anhydride, and, optionally, other additional components (e.g., additional polyols, additional carboxylic acids or anhydrides, polyisocyanates, ethylenically unsaturated compounds, and/or combinations thereof). For example, the self-emulsifying dispersion polymer is typically prepared with polytetrahydrofuran, a carboxylic acid or anhydride, a polyol that is different from the polytetrahydrofuran, and another carboxylic acid or anhydride that is different from the first carboxylic acid or anhydride.

The polytetrahydrofuran can comprise an amount ranging from 20 weight % to 90 weight % of the components that form the self-emulsifying dispersion polymer, or from 40 weight % to 80 weight % of the components that form the self-emulsifying dispersion polymer, or from 50 weight % to 70 weight % of the components that form the self-emulsifying dispersion polymer, or from 80 to 90 weight % of the components that form the self-emulsifying dispersion polymer.

The carboxylic acid or anhydride can comprise an amount ranging from 13 weight % to 21 weight % of the components that form the self-emulsifying dispersion polymer, or from 15 weight % to 18 weight % of the components that form the self-emulsifying dispersion polymer, or from 14 to 16 weight % of the components that form the self-emulsifying dispersion polymer.

As indicated, the polymer reactive with the melamine resin can comprise both the previously described polymeric core-shell particles and the self-emulsifying dispersion polymer. When the coating composition of the present invention comprises both the polymeric core-shell particles and the self-emulsifying dispersion polymer, the coating composition can comprise a greater amount of the polymeric core-shell particles than the self-emulsifying dispersion polymer or a greater amount of the self-emulsifying dispersion polymer than the polymeric core-shell particles.

The acid functionality of the polymer (and/or the polymeric shell itself) that is reactive with the melamine resin can have a pKa of less than 5, or less than 4, or less than 3.5, or less than 3, or less than 2.5, or less than 2. The acid functionality of the polymer that is reactive with the melamine resin can have a pKa range from 1.5 to 4.5. The pKa value is the negative (decadic) logarithms of the acidic dissociation constant, and is determined according to the titration method described in Lange's Handbook of Chemistry, 15th edition, section 8.2.1.

The carboxylic acid functionality found on the polymer can be provided by the first carboxylic acid or anhydride only. Alternatively, when additional carboxylic acid functional compounds and/or anhydrides are used to form the polymer, the carboxylic acid functionality found on the polymer is provided by the first carboxylic acid or anhydride and the additional carboxylic acid functional compounds and/or anhydrides.

The polymer (and/or the polymeric shell itself) can also comprise a hydroxyl equivalent weight of from 1500 to 5000, or from 2000 to 3000, as measured by reacting the dried polymer with an excess amount of acetic anhydride and titrating with potassium hydroxide according to ASTM E222-17.

The polymer reactive with the melamine resin can comprise at least 50 weight %, at 60 weight %, or at least 70 weight %, based on the total resin solids of the coating composition. The polymer reactive with the melamine resin can also comprise up to 90 weight % or up to 80 weight %, based on the total resin solids of the coating composition. The polymer reactive with the melamine resin can further comprise an amount ranging from 50 weight % to 90 weight %, or from 60 weight % to 80 weight %, or from 70 weight % to 80 weight %, or from 70 weight % to 90 weight %, based on the total resin solids of the coating composition.

It is appreciated that the melamine resin, polymer reactive with the melamine resin, and other optional components described herein are dispersed in an aqueous medium. As used herein, an "aqueous medium" refers to a liquid medium comprising greater than 50 weight % water, based on the total weight of the liquid medium. Such aqueous liquid mediums can for example comprise at least 60 weight % water, or at least 70 weight % water, or at least 80 weight % water, or at least 90 weight % water, or at least 95 weight % water, or 100 weight % water, based on the total weight of the liquid medium. The solvents that, if present, make up less than 50 weight % of the liquid medium include organic solvents. Non-limiting examples of suitable organic solvents include polar organic solvents, e.g. protic organic solvents such as glycols, glycol ether alcohols, alcohols, volatile ketones, glycol diethers, esters, and diesters. Other non-limiting examples of organic solvents include aromatic and aliphatic hydrocarbons.

The coating composition can comprise additional materials including, but not limited to, additional resins, such as additional film-forming resins, and additional crosslinkers. As used herein, a "film-forming resin" refers to a resin that when used in a coating composition can form a self-supporting continuous film on at least a horizontal surface through dehydration and/or upon curing. The term "dehydration" refers to the removal of water and/or other solvents. It is appreciated that dehydration can also cause at least partial curing of a resinous material. Further, the terms "curable", "cure", and the like, mean that at least a portion of the resinous materials in a composition is crosslinked or crosslinkable.

The additional resin can include any of a variety of thermoplastic and/or thermosetting film-forming resins known in the art. The term "thermosetting" refers to resins that "set" irreversibly upon curing or crosslinking, wherein the polymer chains of the resins are joined together by covalent bonds. Once cured or crosslinked, a thermosetting resin will not melt upon the application of heat and is insoluble in solvents. As noted, the film-forming resin can also include a thermoplastic film-forming resin. The term "thermoplastic" refers to resins that are not joined by covalent bonds and, thereby, can undergo liquid flow upon heating and can be soluble in certain solvents.

Non-limiting examples of suitable additional resins include polyurethanes, polyesters such as polyester polyols, polyamides, polyethers, polysiloxanes, fluoropolymers, polysulfides, polythioethers, polyureas, (meth)acrylic resins, epoxy resins, vinyl resins, and combinations thereof. The additional resins can also include particulate and non-particulate resins.

The additional resin can have any of a variety of reactive functional groups including, but not limited to, carboxylic acid groups, amine groups, epoxide groups, hydroxyl groups, thiol groups, carbamate groups, amide groups, urea groups, isocyanate groups (including blocked isocyanate groups), (meth)acrylate groups, and combinations thereof. Thermosetting coating compositions typically comprise a crosslinker that may be selected from any of the crosslinkers known in the art to react with the functionality of the resins used in the coating compositions. Alternatively, a thermosetting film-forming resin can be used having functional groups that are reactive with themselves; in this manner, such thermosetting resins are self-crosslinking.

As indicated, the coating composition can also comprise additional crosslinkers. As used herein, a "crosslinking agent", "crosslinker", and like terms refers to a molecule comprising two or more functional groups that are reactive with other functional groups and which is capable of linking two or more monomers or polymer molecules through chemical bonds. Non-limiting examples of crosslinkers include polyhydrazides, carbodiimides, polyols, phenolic resins, epoxy resins, beta-hydroxy (alkyl) amide resins, hydroxy (alkyl) urea resins, oxazoline, alkylated carbamate resins, (meth)acrylates, isocyanates, blocked isocyanates, polyacids, anhydrides, organometallic acid-functional materials, polyamines, polyamides, aminoplasts other than the previously described melamine resin, aziridines, and combinations thereof. The coating compositions of the present invention can also be free of additional film-forming resins and/or crosslinkers such as being free of polyisocyanates.

The coating composition can also include other additional materials such as a colorant. As used herein, "colorant" refers to any substance that imparts color and/or other opacity and/or other visual effect to the composition. The colorant can be added to the coating in any suitable form, such as discrete particles, dispersions, solutions, and/or flakes. A single colorant or a mixture of two or more colorants can be used in the coatings of the present invention.

Example colorants include pigments (organic or inorganic), dyes, and tints, such as those used in the paint industry and/or listed in the Dry Color Manufacturers Association (DCMA), as well as special effect compositions. A colorant may include, for example, a finely divided solid powder that is insoluble, but wettable, under the conditions of use. A colorant can be organic or inorganic and can be agglomerated or non-agglomerated. Colorants can be incorporated into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures thereof. The terms "pigment" and "colored filler" can be used interchangeably.

Example dyes include, but are not limited to, those that are solvent and/or aqueous based such as phthalo green or blue, iron oxide, and bismuth vanadate.

Example tints include, but are not limited to, pigments dispersed in water-based or water miscible carriers such as AQUA-CHEM 896 commercially available from Evonik Industries (Essen, Germany), CHARISMA COLORANTS and MAXITONER INDUSTRIAL COLORANTS commercially available from Accurate Dispersions Division of Eastman Chemical, Inc. (South Holland, IL).

The colorant which can be used with the coating composition of the present invention can also comprise a special effect composition or pigment. As used herein, a "special effect composition or pigment" refers to a composition or pigment that interacts with visible light to provide an appearance effect other than, or in addition to, a continuous unchanging color. Example special effect compositions and pigments include those that produce one or more appearance effects such as reflectance, pearlescence, metallic sheen, texture, phosphorescence, fluorescence, photochromism, photosensitivity, thermochromism, goniochromism, and/or color-change. Non-limiting examples of special effect compositions can include transparent coated mica and/or synthetic mica, coated silica, coated alumina, aluminum flakes, a transparent liquid crystal pigment, a liquid crystal coating, and combinations thereof.

Other non-limiting examples of further materials that can optionally be used with the coating composition of the present invention include plasticizers, abrasion resistant particles, anti-oxidants, hindered amine light stabilizers, UV light absorbers and stabilizers, surfactants, flow and surface control agents, thixotropic agents, catalysts, reaction inhibitors, and other customary auxiliaries.

It is appreciated that the components that form the coating composition can be selected to form a one-component composition ("1K"). As used herein, a "one-component composition" refers to a composition wherein all the coating components are maintained in the same container after manufacture, during storage, etc. In contrast, a multi-component composition, such as a two component composition ("2K") or more, has at least two components that are maintained in a different container after manufacture, during storage, etc. prior to application and formation of the coating over a substrate. Thus, the coating composition can be free of components that are typically used to form a multi-component composition, such as being free of polyisocyanates for example.

The coating composition of the present invention can be deposited over at least a portion of a substrate and dehydrated and/or cured to form a coating layer.

The substrate over which the coating composition may be applied includes a wide range of substrates. For example, the coating composition of the present invention can be applied to a vehicle substrate, an industrial substrate, an aerospace substrate, and the like.

The vehicle substrate may include a component of a vehicle. In the present disclosure, the term "vehicle" is used in its broadest sense and includes all types of aircraft, spacecraft, watercraft, and ground vehicles. For example, the vehicle can include, but is not limited to an aerospace substrate (a component of an aerospace vehicle, such as an aircraft such as, for example, airplanes (e.g., private airplanes, and small, medium, or large commercial passenger, freight, and military airplanes), helicopters (e.g., private, commercial, and military helicopters), aerospace vehicles (e.g., rockets and other spacecraft), and the like). The vehicle can also include a ground vehicle such as, for example, animal trailers (e.g., horse trailers), all-terrain vehicles (ATVs), cars, trucks, buses, vans, heavy duty equipment, tractors, golf carts, motorcycles, bicycles, snowmobiles, trains, railroad cars, and the like. The vehicle can also include watercraft such as, for example, ships, boats, hovercrafts, and the like. The vehicle substrate may include a component of the body of the vehicle, such as an automotive hood, door, trunk, roof, and the like; such as an aircraft or spacecraft wing, fuselage, and the like; such as a watercraft hull, and the like.

The coating composition may be applied over an industrial substrate which may include tools, heavy duty equipment, furniture such as office furniture (e.g., office chairs, desks, filing cabinets, and the like), appliances such as refrigerators, ovens and ranges, dishwashers, microwaves, washing machines, dryers, small appliances (e.g., coffee makers, slow cookers, pressure cookers, blenders, etc.), metallic hardware, extruded metal such as extruded aluminum used in window framing, other indoor and outdoor metallic building materials, and the like.

The coating composition may be applied over storage tanks, windmills, nuclear plant components, packaging substrates, wood flooring and furniture, apparel, electronics, including housings and circuit boards, glass and transparencies, sports equipment, including golf balls, stadiums, buildings, bridges, and the like.

The substrate can be metallic or non-metallic. Metallic substrates include, but are not limited to, tin, steel (including electrogalvanized steel, cold rolled steel, hot-dipped galvanized steel, among others), aluminum, aluminum alloys, zinc-aluminum alloys, steel coated with a zinc-aluminum alloy, and aluminum plated steel. Non-metallic substrates include polymeric materials, plastic and/or composite material, polyester, polyolefin, polyamide, cellulosic, polystyrene, polyacrylic, poly(ethylene naphthalate), polypropylene, polyethylene, nylon, ethylene vinyl alcohol (EVOH), polylactic acid, other "green" polymeric substrates, poly (ethyleneterephthalate) (PET), polycarbonate, polycarbonate acrylobutadiene styrene (PC/ABS), wood, veneer, wood composite, particle board, medium density fiberboard, cement, stone, glass, paper, cardboard, textiles, leather, both synthetic and natural, and the like. The substrate may comprise a metal, a plastic and/or composite material, and/or a fibrous material. The fibrous material may comprise a nylon and/or a thermoplastic polyolefin material with continuous strands or chopped carbon fiber. The substrate can be one that has already been treated in some manner, such as to impart visual and/or color effect, a protective pretreatment or other coating layer, and the like.

The coating composition of the present invention may be particularly beneficial when applied to a metallic substrate. The coatings of the present invention may be particularly beneficial when applied to metallic substrates that are used to fabricate automotive vehicles, such as cars, trucks, and tractors.

The coating composition of the present invention is also particularly beneficial when applied to substrates that form a package, such as metal substrates that form a package. Suitable metal packaging substrates include, but are not limited to, food and/or beverage packaging, components used to fabricate such packaging or monobloc aerosol cans or tubes. Suitable monobloc aerosol cans or tubes include, but are not limited to, deodorant and hair spray containers. Monobloc aerosol cans or tubes may be aluminum monobloc aerosol cans or tubes.

As used herein, a "package" is anything used to contain another item, particularly for shipping from a point of manufacture to a consumer, and for subsequent storage by a consumer. A package will be therefore understood as something that is sealed so as to keep its contents free from deterioration until opened by a consumer. The manufacturer will often identify the length of time during which the food or beverage will be free from spoilage, which typically ranges from several months to years. Thus, the present "package" is distinguished from a storage package or bakeware in which a consumer might make and/or store food; such a package would only maintain the freshness or integrity of the food item for a relatively short period. "Package" as used herein means the complete package itself or any component thereof, such as an end, lid, cap, and the like. For example, a "package" coated with the coating compositions described herein might include a metal can in which only the can end or a portion thereof is coated. A package according to the present invention can be made of metal or non-metal, for example, plastic or laminate, and be in any form. An example of a suitable package is a laminate tube. Another example of a suitable package is metal can. The term "metal can" includes any type of metal can, package or any type of receptacle or portion thereof that is sealed by the food/beverage manufacturer to minimize or eliminate spoilage of the contents until such package is opened by the consumer. One example of a metal can is a food can; the term "food can(s)" is used herein to refer to cans, packages or any type of receptacle or portion thereof used to hold any type of food and/or beverage. "Beverage can" may also be used to refer more specifically to a food can in which a beverage is packaged. The term "metal can(s)" specifically includes food cans, including beverage cans, and also specifically includes "can ends" including "E-Z open ends", which are typically stamped from can end stock and used in conjunction with the packaging of food and beverages. The term "metal cans" also specifically includes metal caps and/or closures such as bottle caps, screw top caps and lids of any size, lug caps, and the like. The metal cans can be used to hold other items as well, including, but not limited to, personal care products, bug spray, spray paint, and any other compound suitable for packaging in an aerosol can. The cans can include "two piece cans" and "three-piece cans" as well as drawn and ironed one-piece cans; such one piece cans often find application with aerosol products. Packages coated with the composition of the present invention can also include plastic bottles, plastic tubes, laminates and flexible packaging, such as those made from PE, PP, PET and the like. Such packaging could hold, for example, food, toothpaste, personal care products and the like.

The coating composition of the present invention may be applied to the interior and/or the exterior of the package. For example, the coating can be roll-coated onto metal used to make a two-piece food can, a three-piece food can, can end stock and/or cap/closure stock. The coating is applied to a coil or sheet by roll coating; the coating is then cured and can ends are stamped out and fabricated into the finished product, i.e. can ends. The coating could also be applied as a rim coat to the bottom of the can; such application can be by roll coating. The rim coat functions to reduce friction for improved handling during the continued fabrication and/or processing of the can. The coating can be applied to the "side stripe" of a metal can, which will be understood as the seam formed during fabrication of a three-piece can. The coating can also be applied to caps and/or closures; such application can include, for example, a protective varnish that is applied before and/or after formation of the cap/closure and/or a pigmented enamel post applied to the cap, particularly those having a scored seam at the bottom of the cap. Decorated can stock can also be partially coated externally with the coating described herein, and the decorated, coated can stock used to form various metal cans. The coating can be applied to can stock before formation of the can or can part, or can be applied be applied to the can or can part after formation. Any material used for the formation of food cans can be treated according to the present methods. Particularly suitable substrates include tin-plated steel, tin-free steel and black-plated steel.

The coating composition can be applied over at least a portion of the substrate by any means standard in the art, such as spraying, electrostatic spraying, dipping, rolling, brushing, and the like. Once applied, the composition can be dehydrated and/or cured to form the coating layer. The coating compositions of the present invention can be cured with various methods including, but not limited to, applying heat.

It was found that the coating composition of the present invention can be dehydrated at 20° C. to 90° C., or from 20° C. to 80° C., or from 20° C. to 70° C., or from 20° C. to 60° C., or from 40° C. to 80° C., or from 40° C. to 70° C. The coating composition can be dehydrated at these temperatures for a period of time of less than 2 minutes, or less than 1 minute. The period of time for dehydrating the coating composition is the designated period of time for dehydration and does not include the time it takes to transfer and subject the coating composition to another step such as a curing step.

The coating composition can also be cured at comparatively low temperatures. For instance, the coating composition can be cured using heat at temperatures of 140° C. or less, or 120° C. or less, or 100° C. or less, or 80° C. or less.

It was found that the coatings of the present invention can be formed at lower dehydration/cure temperatures than those typically required in other coatings commonly applied to substrates such as, for example, substrates that form a package or vehicle. The coatings also provide desired appearance and mechanical/chemical properties, such as good solvent resistance.

The present invention also relates to a multi-layer coating that comprises at least a first basecoat layer and a second basecoat layer. As explained in further detail herein, the multi-layer coating can include additional coating layers including, but not limited to, a primer layer, a topcoat layer, or a combination thereof. A “basecoat layer” refers to a coating layer that is deposited onto a primer and/or directly onto a substrate, optionally including components (such as pigments) that impact the color and/or provide other visual impact. A “topcoat” refers to an uppermost coating that is deposited over another coating layer such as a basecoat to provide a protective and/or decorative layer. A “primer layer” refers to an undercoating that may be deposited onto a substrate in order to prepare the surface for application of a protective or decorative coating system.

The first basecoat layer and/or the second basecoat of the multi-layer coating is formed from the previously described coating composition that comprises the melamine resin and the at least one polymer reactive with the melamine resin. The coating composition used to form the first and/or second basecoat layer can also include one or more of the previously described components such as the additional film-forming resins, crosslinkers, colorants, and/or other optional materials.

The coating compositions used to form the first and second basecoat layers can be the same or different. For instance, the first and second basecoat layers can each comprise a coating composition comprising the melamine resin and the same or different types of polymer(s) reactive with the melamine resin (i.e., the polymeric core-shell particles and/or self-emulsifying dispersion polymer previously described) such that each layer forms a one component composition. In some examples, one of the basecoat layers can be formed from the previously described coating composition and which comprises components that form a one-component composition, while the other coating layer can be formed from components that form a multi-layer composition such as a two-component composition that includes, for example, a polyisocyanate and polyol functional resin.

Alternatively, one of the first or second basecoat layer can be formed with a different coating composition. The different coating layer can be formed with various components including the various resins and crosslinkers previously described such as, for example, with carboxylic acid functional polymeric core-shell particles and which can utilize various crosslinkers such as, for example, carbodiimides.

The first and second basecoat compositions can also comprise the same or different additional resins, crosslinkers, colorants, and other optional materials previously described. For example, the second basecoat composition can comprise special effect pigments and the first basecoat composition can be free of special effect pigments. As such, the first basecoat composition can for example only comprise pigments that impart a continuous unchanging color and the second basecoat layer can for example only comprise special effect pigments. Alternatively, the first basecoat composition can comprise special effect pigments and the second basecoat composition can be free of special effect pigments. As such, the second basecoat composition can for example only comprise pigments that impart a continuous unchanging color and the first basecoat layer can for example only comprise special effect pigments.

The first and second basecoat layers can both be formed from a one-component composition as previously described. Alternatively, one of the basecoat layers can formed from a one-component composition, while the other basecoat layer can formed from a multi-component composition such as a two-component composition.

The first basecoat composition can be applied directly over at least a portion of the substrate by any means standard in the art, such as spraying, electrostatic spraying, dipping, rolling, brushing, and the like. The second basecoat composition can then be applied directly over at least a portion of the first basecoat composition as a wet-on-wet process, (i.e. prior to dehydration of the first basecoat composition). The second basecoat composition can be applied by any means standard in the art, such as spraying, electrostatic spraying, dipping, rolling, brushing, and the like. After the second basecoat composition is applied, both basecoat compositions can be dehydrated simultaneously. Both basecoat compositions can be dehydrated simultaneously at 20° C. to 90° C., or from 20° C. to 80° C., or from 20° C. to 70° C., or from 20° C. to 60° C., or from 40° C. to 80° C., or from 40° C. to 70° C. The coating compositions can be dehydrated, for example, at the above temperatures for a period of time of less than 2 minutes, or less than 1 minute.

The second basecoat composition can also be applied directly over at least a portion of the first basecoat layer that has been dehydrated as previously described. The second basecoat composition can then be dehydrated at 20° C. to 90° C., or from 20° C. to 80° C., or from 20° C. to 70° C., or from 20° C. to 60° C., or from 40° C. to 80° C., or from 40° C. to 70° C. The coating compositions can be dehydrated, for example, at the above temperatures for a period of time of less than 2 minutes, or less than 1 minute. After the dehydrating the second basecoat composition, the basecoats can be cured at temperatures of 140° C. or less, or 120° C. or less, or 100° C. or less, or 80° C. or less.

The multi-layer coating can also comprise a topcoat layer that is applied over at least a portion of the second basecoat layer before or after curing the basecoat layers. The topcoat layer can be formed from a coating composition that comprises a film-forming resin, a crosslinker, an aqueous or organic solvent medium, and/or any of the other materials such as those previously described. For example, the topcoat can comprise a film-forming resin and one or more polyisocyanates, such as at least one uretdione dimer based polyisocyanate that is reactive with the film-forming resin.

The topcoat layer can be a clear topcoat layer. As used herein, a “clear coat layer” refers to a coating layer that is at least substantially transparent or fully transparent. The term "substantially transparent" refers to a coating, wherein a surface beyond the coating is at least partially visible to the naked eye when viewed through the coating. The term "fully transparent" refers to a coating, wherein a surface beyond the coating is completely visible to the naked eye when viewed through the coating. It is appreciated that the clear topcoat layer can comprise colorants, such as pigments, provided that the colorants do not interfere with the desired transparency of the clear topcoat layer. Alternatively, the clear topcoat layer is free of colorants such as pigments (i.e., unpigmented).

Non-limiting examples of topcoat layers that can be used with the multi-layer coating of the present invention include those described in U.S. Pat. No. 4,650,718 at col. 1 line 62 to col. 10 line 16; U.S. Pat. No. 5,814,410 at col. 2 line 23 to col. 9 line 54; and U.S. Pat. No. 5,891,981 at col. 2 line 22 to col. 12 line 37, all of which are incorporated by reference herein. Suitable topcoat coating compositions that can be used to form the topcoat layer also include those commercially available from PPG Industries, Inc. (Pittsburgh, PA) under the tradenames NCT, DIAMOND COAT, and CERAMICLEAR.

As indicated, the topcoat layer can be cured simultaneously with the first and second basecoat layers. For instance, the topcoat layer and basecoat layers can be simultaneously cured at temperatures of 140° C. or less, or 120° C. or less, or 100° C. or less, or 80° C. or less.

The multi-layer coating according to the present invention can also comprise other optional layers including, but not limited to, additional basecoat layers as well as a primer coating layer as indicated above. The primer coating layer can be formed over at least a portion of the substrate and the first or second basecoat layer can be formed over at least a portion of the primer coating layer. Further, the additional basecoat layers can be prepared from any of the materials previously described. The additional basecoat layers can be applied, for example, over the first or second basecoat layer before applying the topcoat layer.

The primer coating layer optionally used with the multi-layer coating of the present invention can be formed from a coating composition that comprises a film-forming resin such as a cationic based resin, an anionic based resin, and/or any of the additional film-forming resins previously described. The coating composition used to form the primer coating composition can also include the previously described crosslinkers, colorants, and other optional materials.

Additionally, the primer coating composition can include a corrosion inhibitor. As used herein, a "corrosion inhibitor" refers to a component such as a material, substance, compound, or complex that reduces the rate or severity of corrosion of a surface on a metal or metal alloy substrate. The corrosion inhibitor can include, but is not limited to, an alkali metal component, an alkaline earth metal component, a transition metal component, or combinations thereof. The term "alkali metal" refers to an element in Group 1 (International Union of Pure and Applied Chemistry (IUPAC)) of the periodic table of the chemical elements, and includes, e.g., cesium (Cs), francium (Fr), lithium (Li), potassium (K), rubidium (Rb), and sodium (Na). The term "alkaline earth metal" refers to an element of Group 2 (IUPAC) of the periodic table of the chemical elements, and includes, e.g., barium (Ba), beryllium (Be), calcium (Ca), magnesium (Mg), and strontium (Sr). The term "transition metal" refers to an element of Groups 3 through 12 (IUPAC) of the periodic table of the chemical elements, and includes, e.g., titanium (Ti), Chromium (Cr), and zinc (Zn), among various others.

Specific non-limiting examples of inorganic components that act as a corrosion inhibitor include magnesium oxide, magnesium hydroxide, magnesium carbonate, magnesium phosphate, magnesium silicate, zinc oxide, zinc hydroxide, zinc carbonate, zinc phosphate, zinc silicate, zinc dust, and combinations thereof.

As indicated, the primer coating composition can be deposited directly over at least a portion of a substrate before application of the first or second basecoat composition and dehydrated and/or cured to form the primer coating layer. The primer coating composition of the present invention can be applied by any means standard in the art, such as electrocoating, spraying, electrostatic spraying, dipping, rolling, brushing, and the like. Once the primer coating composition is applied to at least a portion of the substrate, the composition can be dehydrated and/or cured to form the primer coating layer. The primer coating composition can be dehydrated and/or cured, for example, at a temperature of 175° C. to 205° C. to form the primer coating layer.

It was found that the multi-layer coatings of the present invention can be formed at lower dehydration/cure temperatures than those typically required in other coatings commonly applied to automotive substrates such as vehicles. As such, the multi-layer coatings of the present invention help reduce costs, eliminate the amount of coating equipment, and speed up the overall coating process.

The present invention is also directed to a process of preparing a multi-layer coating. The process includes: forming a first basecoat layer over at least a portion of a substrate by depositing a first coating composition onto at least a portion of the substrate; and forming a second basecoat layer over at least a portion of the first basecoat layer by depositing a second coating composition directly onto at least a portion of: (1) the first basecoat layer after the first coating composition is dehydrated; or (2) the first coating composition before the first basecoat composition is dehydrated. The first and second basecoat compositions can be dehydrated separately or simultaneously and then cured as previously described. Optionally, a topcoat layer is formed over at least a portion of the second basecoat layer by depositing a topcoat composition directly onto at least a portion of the second basecoat layer. When the topcoat layer is used, the basecoat layers and topcoat layer can be cured simultaneously.

The substrate can optionally comprise a primer coating layer and the first basecoat layer is applied over at least a portion of the primer coating layer by depositing a first basecoat composition directly onto at least a portion of the primer coating layer. The primer coating layer can be formed by depositing a primer coating composition, such as by electrodepositing an electrodepositable coating composition, onto at least a portion of the substrate prior to depositing the first basecoat composition.

The multi-coatings can be applied to any kind of substrate as described above, such as for example to automotive parts in an automotive assembly plant. In some examples, during application of the multi-layer coating in an automotive assembly plant, a metal substrate is, optionally, first passed to an electrodeposition station where the primer coating composition is electrodeposited over the metal substrate and dehydrated and/or cured. The first basecoat composition is then directly applied over the electrodeposited coating layer or, alternatively, directly applied over at least a portion of the substrate in a basecoat zone comprising one or more coating stations. The basecoat zone can be located downstream of and adjacent to an electrodeposition oven. The first basecoat station has one or more conventional applicators, e.g., bell or gun applicators, connected to or in flow communication with a source of the first basecoat composition. The first basecoat composition can be applied, e.g., sprayed, over the substrate by one or more applicators at the first basecoat station in one or more spray passes to form a first basecoat layer over the substrate.

The first basecoat can be dehydrated with a conventional drying device, such as an oven, located downstream of and/or adjacent to the second coating station and/or the first coating station. After applying the second basecoat composition, the second basecoat layer can be dehydrated separately if the first basecoat layer has been previously dehydrated. Alternatively, when the second basecoat composition is applied wet-on-wet to the first basecoat composition, both basecoat compositions can be simultaneously dehydrated. The basecoats can then be cured using an oven.

After the first basecoat composition and second basecoat composition have been dehydrated and/or cured, one or more conventional topcoat layers can be applied over the basecoat layer(s) at a topcoat station. The topcoat station includes one or more conventional applicators, e.g., bell applicators, connected to and in flow communication with a source of the topcoat composition. An oven is located downstream of and/or adjacent to the topcoat station to dehydrate and/or cure the topcoat composition separately or simultaneously with the basecoats.

A non-limiting example of an automotive assembly plant for applying a multi-layer coating is described in U.S. Pat. No. 8,846,156 at col. 3 line 1 to col. 4 line 43 and FIG. 1, which is incorporated by reference herein.

EXAMPLES

The following examples are presented to demonstrate the general principles of the invention. The invention should not be considered as limited to the specific examples presented. All parts and percentages in the examples are by weight unless otherwise indicated.

Further, in the following examples, Brookfield viscosities were measured at 25° C. on a Brookfield Viscometer DV-II+ Pro, manufactured by Brookfield Engineering (Middleboro, MA) using spindle #2 at 60 RPM. Acid values and hydroxyl values were determined using a Metrohm 798 MPT Titrino automatic titrator, manufactured by Metrohm AG (Herisau, Switzerland), according to ASTM D 4662-15 and ASTM E 1899-16, respectively. Non-volatile (solids) contents were measured by comparing initial sample weights to sample weights after exposure to 110° C. for 1 hour.

Weight and number average molecular weight of polymeric samples were measured by gel permeation chromatography relative to linear polystyrene standards of 800 to 900,000 Da. Gel permeation chromatography was performed using a Waters 2695 separation module with a Waters 2414 differential refractometer (RI detector), manufactured by the Waters Corporation (Milford, MA). Tetrahydrofuran (THF) was used as the eluent at a flow rate of 1 ml min-1. Two PLgel Mixed-C (300×7.5 mm) columns, manufactured by Agilent Technologies (Santa Clara, CA), were used for separation. The pH measurements provided herein were measured using a Fisherbrand accumet AE150 Benchtop pH meter. Manufactured by Thermo Fisher Scientific (Waltham, MA), at room temperature (i.e., 23-25° C.). Dry film thickness was measured using a Elcometer PG70ABDL Precision Thickness gauge, manufactured by Elcometer USA (Manchester, United Kingdom), at room temperature (i.e., 23-25° C.)

Comparative Example 1

Preparation of Comparative Polyester A

Polyester A was prepared as Polyester A1 described in EP 1454971. The acid value of Polyester A was 29-31.

Example 2

Preparation of Polyester B

Polyester B according to the present invention was prepared from the components listed in Table 1.

TABLE 1

| Component | Amount (grams) |
|---|---|
| Charge 1 | |
| TERATHANE 650[1] | 910 |
| 1,6-hexanediol | 247.8 |
| trimellitic anhydride | 403.2 |
| butylstannoic acid | 1.5 |
| triphenyl phosphite | 1.5 |
| Charge 2 | |
| DOWANOL DPM[2] | 75.5 |
| Charge 3 | |
| dimethylethanol amine | 99.7 |
| deionized water | 897 |
| Charge 4 | |
| deionized water | 1330 |

[1]polytetramethylene ether glycol commercially available from Invista (Wichita, KS)

[2]dipropylene glycol methyl ether commercially available from The Dow Chemical Company (Midland, MI)

To a four necked, 5 liter reaction flask outfitted with a stirrer, gas inlet, thermometer, small packed column and condenser, the contents of Charge 1 were added. The reaction mixture was heated to a maximum temperature of 175° C. and the acid value was measured hourly as water was removed. When an acid value of at least 80 was reached, the temperature was reduced to 165° C. The reaction was continued until the cut viscosity (60% in xylene) was in the Gardner Holdt viscosity range of V-Y with an acid value of 51 to 55 based on the total resin solids. The temperature was reduced to 130° C. and Charge 2 was added to the reaction mixture. The temperature was then reduced to 100° C., and an aqueous dispersion was produced by alternately adding Charge 3 and Charge 4 to the reaction mixture. The final dispersion had a solids value of 37%, a Brookfield viscosity of 3000 cps at room temperature (i.e., 23-25° C.), and pH of 6.6.

Comparative Example 3

Preparation of Comparative Polyester C

Polyester C was prepared from the components listed in Table 2.

TABLE 2

| Component | Amount (grams) |
|---|---|
| Charge 1 | |
| 1,6-hexanediol | 472 |
| trimellitic anhydride | 384 |
| butylstannoic acid | 0.8 |
| triphenyl phosphite | 0.8 |
| Charge 2 | |
| DOWANOL DPM[2] | 41 |
| Charge 3 | |
| dimethylethanol amine | 62.3 |
| deionized water | 561 |
| Charge 4 | |
| deionized water | 794 |

To a four necked, 5 liter reaction flask outfitted with a stirrer, gas inlet, thermometer, small packed column and condenser, the contents of Charge 1 were added. The contents were heated to 175° C. and the acid value was measured hourly as water was removed. When an acid value of 80 was reached, the temperature was reduced to 165° C. and the reaction was continued until an acid value of 76 was measured. The temperature was then reduced to 130° C. and Charge 2 was added to the flask. After cooling to 100° C., an aqueous dispersion was produced by alternately adding Charge 3 and Charge 4 to the flask. The final dispersion had a solids value of 36%, a Brookfield viscosity of 400 cps at room temperature (i.e., 23-25° C.), and a pH of 6.5.

Comparative Example 4

Preparation of Comparative Polyester D

Polyester D was prepared from the components listed in Table 3.

TABLE 3

| Component | Amount (grams) |
|---|---|
| Charge 1 | |
| TERATHANE 250[3] | 212.5 |
| 1,6-hexanediol | 300.9 |

TABLE 3-continued

| Component | Amount (grams) |
|---|---|
| trimellitic anhydride | 326.4 |
| butylstannoic acid | 0.8 |
| triphenyl phosphite | 0.8 |
| Charge 2 | |
| DOWANOL DPM[2] | 40.5 |
| Charge 3 | |
| dimethylethanol amine | 53 |
| deionized water | 476.6 |
| Charge 4 | |
| deionized water | 869 |

[3]polytetramethylene ether glycol commercially available from Invista (Wichita, KS)

To a four necked, 5 liter reaction flask outfitted with a stirrer, gas inlet, thermometer, small packed column and condenser, the contents of Charge 1 were added. The contents were heated to 175° C. and the acid value was measured hourly as water was removed. When an acid value of 75 was reached, the temperature was reduced to 165° C. and the reaction was continued until an acid value of 65 was measured. The temperature was then reduced to 130° C. and Charge 2 was added to the flask. After cooling to 100° C., an aqueous dispersion was produced by alternately adding Charge 3 and Charge 4 to the flask. The final dispersion had a solids value of 36%, a Brookfield viscosity of 800 cps at room temperature (i.e., 23-25° C.), and a pH of 6.6.

Examples 5-12

Preparation of Coatings

The coating compositions were prepared according to the amounts shown in Table 4 using the following method. Each coating composition was mixed in a plastic cup using a stirrer until thoroughly blended. Once each coating composition was fully blended, each composition was allowed to sit under ambient conditions for 2-3 hours prior to application to a test panel. Each composition was applied to a test panel using a draw down bar. Each test panel was a 4"×12" steel substrate which was pre-coated with an ED7400 electrocoat primer (commercially available from PPG Industries, Inc. (Pittsburgh, PA)) which had been processed and baked according to the manufacturer's recommendations. The test panels containing the wet drawn-down coating compositions were left at ambient conditions for up to 5 minutes and is then subsequently baked at 80° C. in an oven for 30 minutes. The dry film thickness of the cured coating compositions was from 15-18 microns. Each coated test panel was allowed to sit at ambient conditions for 20 to 60 minutes prior to conducting the Solvent Resistance Test.

TABLE 4

| Example | Polyester/ RESIMENE HM2608[4] (weight ratio) | Polyester A | Polyester B | Polyester C | Polyester D | RESIMENE HM2608[3] |
|---|---|---|---|---|---|---|
| CE 5 | 90/10 | 125 | — | — | — | 5.6 |
| 6 | 90/10 | — | 125 | — | — | 5.6 |
| CE 7 | 90/10 | — | — | 125 | — | 5.6 |
| CE 8 | 90/10 | — | — | — | 125 | 5.6 |
| CE 9 | 80/20 | 111 | — | — | — | 11.1 |
| 10 | 80/20 | — | 111 | — | — | 11.1 |

TABLE 4-continued

| Example | Polyester/ RESIMENE HM2608[4] (weight ratio) | Polyester A | Polyester B | Polyester C | Polyester D | RESIMENE HM2608[3] |
|---|---|---|---|---|---|---|
| CE 11 | 80/20 | — | — | 111 | — | 11.1 |
| CE 12 | 80/20 | — | — | — | 111 | 11.1 |

[4]methylated melamine formaldehyde resin commercially available from Prefere Resins Holding GmbH (Erkner, Germany)

Evaluation of Coatings

The Solvent Resistance Test was performed on each cured coating composition using the following procedure. The test panel was placed on a flat, firm surface. A piece of Fisher Brand 4"×4" 12 ply gauze was placed over the ball end of a one (1) pound Ball-Peen hammer. A rubber band was used to secure to gauze on the test panel such that no wrinkles would be formed. The gauze was saturated with methyl ethyl ketone (MEK). The saturated gauze was then immediately rubbed with the hammer over the test area using a back and forth stroke of 4-6 inches. Downward or upward pressure should not be exerted on the hammer handle, as the weight of the hammer itself controls the downward pressure. The gauze was re-saturated with MEK every 25 double rubs. The double rubs were continued, where one "double rub" includes both a forward and backward motion, until the bare substrate was exposed in the center of the strip where the rubs are performed. The test results shown in Table 5 indicate the number of double rubs required to expose the bare substrate in the center of the rub strip. The area of gauze should be rotated for the next test set. Gauze used for testing should always be rotated to a fresh spot every time a new area is tested. A single piece of 4×4 gauze typically includes 5-10 test areas.

TABLE 5

| Example | Solvent resistance (MEK double rubs) |
|---|---|
| CE 5 | 11 |
| 6 | 45 |
| CE 7 | 15 |
| CE 8 | 13 |
| CE 9 | 25 |
| 10 | 45 |
| CE 11 | 18 |
| CE 12 | 17 |

The results in Table 5 show that Polyester B (acid value of 51-55) has significantly better solvent resistance compared to Polyester A (acid value of 29-31). Polyester C and Polyester D also exhibited poorer solvent resistance compared to Polyester B. Polyester C and Polyester D had acid values of 76 and 65, respectively, based on total resin solids content.

Whereas particular embodiments of this invention have been described above for purposes of illustration, it will be evident to those skilled in the art that numerous variations of the details of the present invention may be made without departing from the invention as defined in the appended claims.

The invention claimed is:

1. A coating composition comprising:

(a) a melamine resin comprising imino and methylol functional groups that together comprise 30 mole % or greater of the total functionality of the melamine resin; and (b) at least one polymer reactive with (a) that is obtained from components comprising polytetrahydrofuran and a carboxylic acid or anhydride thereof, wherein the polytetrahydrofuran comprises greater than 20 weight % of the components that form the polymer (b) and the carboxylic acid or anhydride thereof comprises greater than 18.5 weight % of the components that form the polymer (b), and wherein the polymer (b) has an acid value ranging from 45 to 60 based on the total resin solids of the polymer (b) if it does not comprise core-shell particles; or wherein the polymer (b) reactive with the melamine resin (a) comprises polymeric core-shell particles, wherein at least a portion of a polymeric shell of the core-shell particles is covalently bonded to at least a portion of a polymeric core of the core-shell particles, and wherein the polymer shell of the core-shell particles is obtained from components comprising greater than 20 weight % of the components that form the polymeric shell of polytetrahydrofuran and greater than 18.5 weight % of the components that form the polymeric shell of carboxylic acid or anhydride thereof and in which the polymeric shell has an acid value ranging from 45 to 60 based on the total resin solids of the polymer that forms the polymeric shell.

2. The coating composition of claim 1, wherein the carboxylic acid or anhydride thereof comprises at least one aromatic ring, and wherein the carboxylic acid or anhydride functional groups are bonded directly to the aromatic ring.

3. The coating composition of claim 1, wherein the carboxylic acid or anhydride thereof comprises trimellitic anhydride.

4. The coating composition of claim 1, wherein the polymeric shell of the core-shell particles comprises ether linkages and ester linkages, urethane linkages, or a combination thereof.

5. The coating composition of claim 1, wherein the polymeric shell of the core-shell particles comprises carboxylic acid functional groups and hydroxyl functional groups.

6. The coating composition of claim 1, wherein the polymeric core of the core-shell particles comprises an addition polymer derived from ethylenically unsaturated monomers.

7. The coating composition of claim 1, wherein the polymer (b) reactive with the melamine resin (a) comprises a self-emulsifying dispersion polymer.

8. The coating composition of claim 7, wherein the polytetrahydrofuran comprises greater than 40 weight % of the components that form the self-emulsifying dispersion polymer.

9. The coating composition of claim 7, wherein the self-emulsifying dispersion polymer comprises ether linkages and ester linkages, urethane linkages, or a combination thereof.

10. The coating composition of claim 1, wherein the polymer (b) reactive with the melamine resin (a) comprises both: (i) the polymeric core-shell particles; and (ii) the self-emulsifying dispersion polymer.

11. The coating composition of claim 1, wherein (a) the melamine resin comprises from 5 weight % to 40 weight % of the coating composition, based on the total resin solids of the coating composition.

12. The coating composition of claim 1, wherein the polymer (b) reactive with the melamine resin (a) comprises from 50 weight % to 90 weight % of the total resin solids of the coating composition.

13. A substrate at least partially coated with a coating formed from the coating composition of claim 1.

14. The substrate of claim 13, wherein the substrate forms at least a portion of a vehicle.

15. The substrate of claim 13, wherein the substrate forms at least a portion of a package.

16. The substrate of claim 15, wherein the package comprises a metal can, an aerosol can or tube, or a monobloc aerosol can or tube.

17. A multi-layer coating system, comprising:

a first basecoat layer applied over at least a portion of a substrate; and a second basecoat layer applied over at least a portion of the first basecoat layer, wherein at least one of the first basecoat layer and the second basecoat layer is formed from the coating composition according to claim 1.

18. The multi-layer coating system of claim 17, further comprising a primer coating layer applied over at least a portion of the substrate, wherein the first primer coating layer is positioned between the first basecoat layer and the substrate.

19. The multi-layer coating system of claim 17, further comprising a topcoat layer applied over at least a portion of the second basecoat layer.

20. A process of coating a substrate with a multi-layer coating, comprising:

forming a first basecoat layer over at least a portion of a substrate by depositing a first basecoat composition onto at least a portion of the substrate; and forming a second basecoat layer over at least a portion of the first basecoat layer by depositing a second basecoat composition directly onto at least a portion of (1) the first basecoat layer after the first basecoat composition is dehydrated or (2) the first basecoat composition before the first basecoat composition is dehydrated, and wherein at least one of the first basecoat layer and the second basecoat layer is formed from the coating composition according to claim 1.

21. The process of claim 20, wherein the first basecoat composition is dehydrated before application of the second basecoat composition.

22. The process of claim 20, wherein both the first and second basecoat compositions are simultaneously dehydrated.

23. The process of claim 22, wherein, after dehydration, the first and second basecoats together comprise a solids content of at least 80 weight %, based on the total weight of the first and second basecoats.

24. The process of claim 20, further comprising curing the first and second basecoats at a temperature of 120° C. or less.

25. The process of claim 20, further comprising applying a topcoat composition over at least a portion of the second basecoat composition and curing the first and second coating compositions and the topcoat composition simultaneously at a temperature of 120° C. or less.

* * * * *